United States Patent
Mo et al.

(10) Patent No.: US 11,444,562 B2
(45) Date of Patent: Sep. 13, 2022

(54) DETERMINING AN INITIAL POSITION OF A ROTOR OF A PERMANENT MAGNET SYNCHRONOUS MACHINE

(71) Applicant: Eaton Intelligent Power Limited, Dublin (IE)

(72) Inventors: Yaojin Mo, Shenzhen (CN); Huaqiang Li, Menomonee Falls, WI (US); Jimmy Qi, Menomonee Falls, WI (US); Tony Zhao, Shenzhen (CN); Hao Cai, Shenzhen (CN)

(73) Assignee: Eaton Intelligent Power Limited, Dublin (IE)

( * ) Notice: Subject to any disclaimer, the term of this patent is extended or adjusted under 35 U.S.C. 154(b) by 227 days.

(21) Appl. No.: 16/801,655

(22) Filed: Feb. 26, 2020

(65) Prior Publication Data

US 2020/0313591 A1 Oct. 1, 2020

Related U.S. Application Data

(60) Provisional application No. 62/824,556, filed on Mar. 27, 2019.

(51) Int. Cl.
*H02P 21/18* (2016.01)
*H02P 21/22* (2016.01)
(Continued)

(52) U.S. Cl.
CPC ............ *H02P 21/32* (2016.02); *H02P 6/183* (2013.01); *H02P 21/18* (2016.02); *H02P 21/22* (2016.02); *H02P 25/03* (2016.02); *H02P 2203/11* (2013.01)

(58) Field of Classification Search
CPC .......... H02P 21/32; H02P 21/18; H02P 21/22; H02P 25/03; H02P 6/183
See application file for complete search history.

(56) References Cited

U.S. PATENT DOCUMENTS 6,940,250 B2 * 9/2005 Nishimura ............ H02P 25/03
318/710
7,388,346 B2 * 6/2008 Nishimura ............ H02P 21/06
318/434

(Continued)

FOREIGN PATENT DOCUMENTS

CN 104079217 A 10/2014

OTHER PUBLICATIONS

Ha et al., "Sensorless Rotor Position Estimation of an Interior Permanent-Magnet Motor From Initial States," IEEE Transactions on Industry Applications, vol. 39, No. 3, pp. 761-767 (2003).

(Continued)

*Primary Examiner* — Thai T Dinh
(74) *Attorney, Agent, or Firm* — DiBerardino McGovern IP Group LLC

(57) ABSTRACT

In one aspect, a system for determining an initial angular position of a rotor of a synchronous machine includes a motor driver module configured to provide a motor driver voltage signal to the synchronous machine, the motor driver voltage signal being sufficient to induce an electrical current in the synchronous machine; and a rotor position determination module configured to receive an indication of the current generated in the machine and to determine the initial position of the rotor based on the indication of the current generated in the machine. The motor driver voltage signal includes at least a first portion, a second portion, and a third portion, the first portion has a first non-zero voltage during a first temporal duration, the second portion has a second non-zero voltage during a second temporal duration, and the third portion has a substantially zero voltage during a third temporal duration, the first portion has a first polarity and the second portion has a second polarity that is opposite to the (Continued)

first polarity, and the first temporal duration and the second temporal duration are different.

20 Claims, 8 Drawing Sheets

(51) Int. Cl.
*H02P 21/32* (2016.01)
*H02P 25/03* (2016.01)
*H02P 6/18* (2016.01)

(56) References Cited

U.S. PATENT DOCUMENTS

| 7,564,206 | B2* | 7/2009 | Oomura | H02P 21/22 |
| | | | | 318/400.26 |
| 7,872,438 | B2* | 1/2011 | Morimoto | H02P 25/024 |
| | | | | 318/705 |
| 8,330,402 | B2 | 12/2012 | Ide et al. | |
| 9,154,065 | B2 | 10/2015 | Yamazaki et al. | |
| 2007/0252587 | A1* | 11/2007 | Stauder | G01D 5/2006 |
| | | | | 324/207.15 |
| 2009/0128074 | A1* | 5/2009 | Hu | H02P 6/21 |
| | | | | 318/400.33 |
| 2014/0015458 | A1* | 1/2014 | Lin | H02P 6/188 |
| | | | | 318/400.03 |
| 2017/0082419 | A1* | 3/2017 | Li | G01R 19/16547 |
| 2017/0170767 | A1* | 6/2017 | Yoshiya | H02P 6/20 |

OTHER PUBLICATIONS

Yoon et al., "High-Bandwidth Sensorless Algorithm for AC Machines Based on Square-Wave-Type Voltage Injection," IEEE Transactions on Industry Applications, vol. 47, No. 3, pp. 1361-1370 (2011).

* cited by examiner

| Pre-defined position (°) | Identification Results (°) | | | | | | | | |
|---|---|---|---|---|---|---|---|---|---|
| | test1 | test2 | test3 | test4 | test5 | test6 | Average Value | Average Error | Maximum Error |
| 0 | 0.2 | 0.4 | -1.1 | 0 | 1.9 | -0.6 | 0.2 | 0.2 | 1.9 |
| 45 | 43.7 | 44.1 | 43.3 | 44.3 | 42.4 | 43.5 | 43.6 | 1.4 | 2.6 |
| 90 | 90.2 | 89.9 | 90.7 | 88.6 | 87.5 | 88.8 | 89.3 | 0.7 | 2.5 |
| 120 | 120.7 | 118.8 | 114 | 118.8 | 119.9 | 121.5 | 118.9 | 1.1 | 6 |
| 160 | 161.3 | 163.2 | 158.1 | 156.7 | 159.6 | 156.2 | 159.2 | 0.8 | 3.8 |
| 180 | 180.2 | 172.3 | 175.5 | 174.8 | 178.8 | 179.7 | 176.9 | 3.1 | 7.7 |
| 200 | 199.1 | 202.1 | 198.9 | 202.1 | 200 | 197.9 | 200 | 0 | 2.1 |
| 240 | 236.6 | 236.6 | 233.1 | 237.2 | 238.5 | 233.7 | 236 | 4 | 6.9 |
| 270 | 266.5 | 270.8 | 265.6 | 268.5 | 270.7 | 268 | 268.4 | 1.6 | 4.4 |
| 300 | 298.7 | 301.1 | 299.4 | 300.6 | 300.8 | 303.1 | 300.6 | 0.6 | 3.1 |
| 350 | 348.6 | 350.4 | 347.3 | 347.4 | 349.6 | 346.6 | 348.3 | 1.7 | 3.4 |

DETERMINING AN INITIAL POSITION OF A ROTOR OF A PERMANENT MAGNET SYNCHRONOUS MACHINE

CROSS-REFERENCE TO RELATED APPLICATION

This application claims the benefit of U.S. Provisional Application No. 62/824,556, filed on Mar. 27, 2019 and titled DETERMINING AN INITIAL POSITION OF A ROTOR OF A PERMANENT MAGNET SYNCHRONOUS MACHINE, which is incorporated herein by reference in its entirety.

TECHNICAL FIELD

This disclosure relates to determining an initial position of a rotor of a permanent magnet synchronous machine (PMSM), such as a three-phase permanent magnet synchronous electrical motor or a permanent magnet synchronous generator.

BACKGROUND

An electric motor converts electrical energy into mechanical energy that is provided to a load. A synchronous electric motor is an alternating current (AC) motor. In steady-state operation, the motion of a rotating shaft (for example, a rotor) of the synchronous electric motor is synchronized with the frequency of the AC electrical power that is applied to windings in a stationary portion (such as the stator) of the motor. A permanent magnet embedded within the shaft or on the surface of the shaft rotates in time with the oscillations of the AC electrical power applied to the stator windings such that the shaft also rotates in time with the oscillations of the AC electrical power.

SUMMARY

In one aspect, a system for determining an initial angular position of a rotor of a synchronous machine includes a motor driver module configured to provide a motor driver voltage signal to the synchronous machine, the motor driver voltage signal being sufficient to induce an electrical current in the synchronous machine; and a rotor position determination module configured to receive an indication of the current induced in the machine and to determine the initial position of the rotor based on the indication of the current induced in the machine. The motor driver voltage signal includes at least a first portion, a second portion, and a third portion, the first portion has a first non-zero voltage during a first temporal duration, the second portion has a second non-zero voltage during a second temporal duration, and the third portion has a substantially zero voltage during a third temporal duration, the first portion has a first polarity and the second portion has a second polarity that is opposite to the first polarity, and the first temporal duration and the second temporal duration are different.

Implementations may include one or more of the following features. The third temporal duration may be different from the first temporal duration or the second temporal duration.

The third temporal duration may be different from the first temporal duration and the second temporal duration.

The first non-zero voltage and the second non-zero voltage may be different.

The motor driver voltage signal may include a first segment and a second segment that occurs before or after the first segment, the first segment may include the first portion, and the second portion, the second segment may include a fourth portion and a fifth portion, the fourth portion may have the first non-zero voltage, the first temporal duration, and the second polarity, and the fifth portion may have the second non-zero voltage and the first polarity.

The system also may include a modulation apparatus configured to receive electrical power from a direct-current power source and to convert the electrical power into the motor driver voltage signal.

The indication of the current induced in the synchronous machine may include an indication of a current drawn by each of three phases of the synchronous machine, and the rotor position determining module may include: a transformation module configured to convert the indication into a d-axis current component and a q-axis current component, the d-axis current component and the q-axis current component being associated with a rotating rectangular coordinate system defined by a d-axis and a q-axis; a regulator module configured to compare the q-axis current component to a reference and to determine a first estimate of a rotational angle of the rotor; a comparator module configured to compare the d-axis current component to a prior d-axis current component and to determine a direction of rotation of the rotor based on the comparison; and a position determination module configured to estimate the position of the rotor based on the first estimate of the rotational angle of the rotor and the direction of rotation of the rotor.

In another aspect, a method of determining an initial angular position of a rotor in a synchronous machine includes generating a motor driver voltage signal including at least a first portion, a second portion, and a third portion, where the first portion has a first non-zero voltage during a first temporal duration, the second portion has a second non-zero voltage during a second temporal duration, and the third portion has a substantially zero voltage during a third temporal duration; the first portion has a first polarity and the second portion has a second polarity that is opposite to the first polarity; and the first temporal duration and the second temporal duration are different. The method also includes applying the motor driver voltage signal to the synchronous machine; measuring an induced current in the motor after applying the motor driver voltage signal to the synchronous machine; and determining the initial angular position of the rotor based on the measured induced current.

Implementations may include one or more of the following features. Measuring an induced current may include measuring an induced current in each of three phases, and the method also may include determining a q-axis current component from the measured induced current in each of the three phases; determining an error metric by comparing the determined q-axis current component to a reference q-axis current component; regulating the q-axis current to reduce the error metric; determining whether the error metric is less than a threshold error metric for a test temporal period; if the error metric is less than the threshold error metric for the test temporal period, determining a direction of rotation of the rotor; and if the error metric is not less than the threshold error metric for the test temporal period, applying the motor driver voltage signal to the synchronous machine.

Determining a direction of rotation of the rotor may include comparing the d-axis current component to a previous d-axis current component. The reference q-axis current component may include a value of zero.

The motor driver voltage signal may include a first segment and a second segment that occurs before or after the first segment, the first segment may include the first portion and the second portion, the second segment may include a fourth portion and a fifth portion, the fourth portion may have the first non-zero voltage, the first temporal duration, and the second polarity, and the fifth portion may have the second non-zero voltage and the first polarity.

Implementations of any of the techniques described herein may include an apparatus, a device, a system, and/or a method. The details of one or more implementations are set forth in the accompanying drawings and the description below. Other features will be apparent from the description and drawings, and from the claims.

DRAWING DESCRIPTION

FIGS. 5 and 6 show examples of experimental results.

DETAILED DESCRIPTION

Figure 1A:
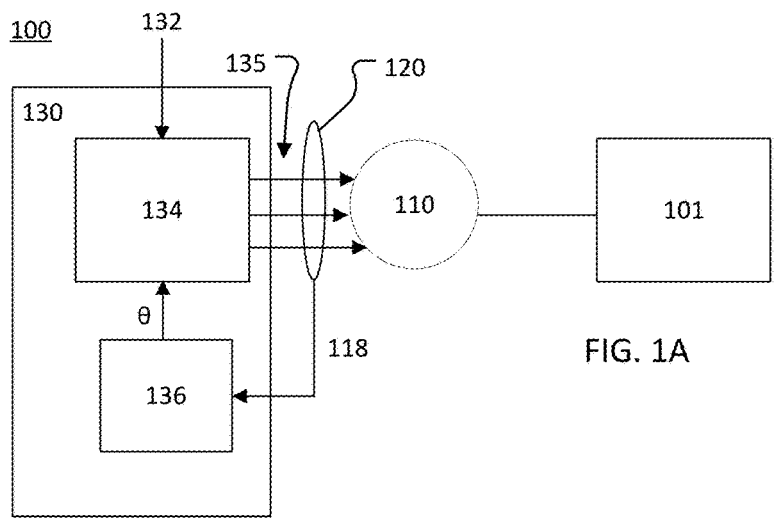
FIG. 1A is a block diagram of a system that includes a three-phase permanent magnet synchronous motor.

FIG. 1A is a block diagram of a system 100 that includes a three-phase permanent magnet synchronous motor 110 that drives a load 101. The system 100 also includes a motor control system 130 that estimates an initial angular position (θ) of a rotor 114 (FIG. 1B) by analyzing a sensed current 118 that arises in response to applying a high-frequency motor driver voltage signal 132 to the control system 130. The signal 132 is a high-frequency signal in that the frequency of the signal 132 is much higher than the rated operation frequency of the motor 110. Thus, the rotor 114 does not move in response to the signal 132. As discussed in more detail below, the high-frequency motor driver voltage signal 132 includes features that allow the initial angular position (θ) of the rotor 114 to be determined with a greater accuracy than known techniques. Moreover, the technique implemented by the control system 130 does not rely on separate sensors that sense the position of the rotor 114.

Figure 1B:
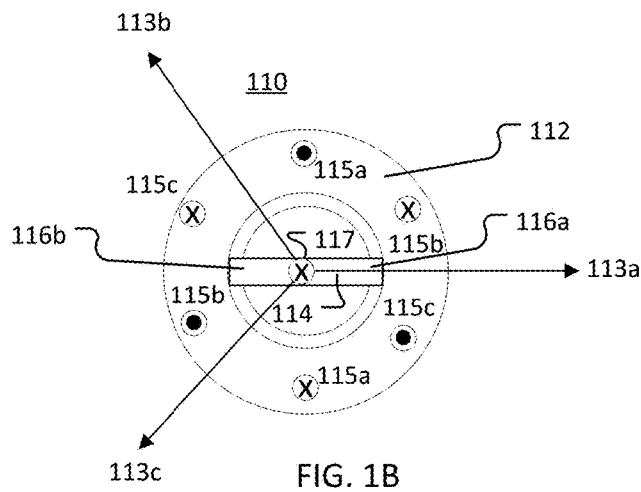
FIG. 1B is a cross-sectional view of the motor of FIG. 1A.
Figure 1C:
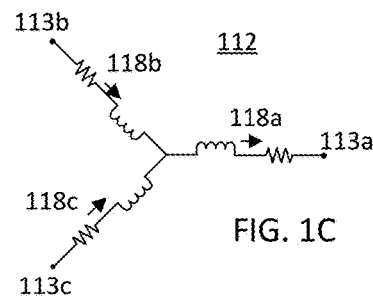
FIG. 1C is a schematic circuit diagram of stator windings of the motor of FIG. 1A.

FIG. 1B is a cross-sectional view of the motor 110. The motor 110 includes a stator 112, which is spatially fixed, and a rotor 114, which rotates about an axis 117 when time-varying (AC) electrical energy is applied to the motor 110. In the example of FIG. 1B, the axis 117 extends into the page. The rotor 114 may rotate about the axis 117 in a clockwise or counterclockwise direction. The stator 112 includes one electrical winding per phase. Thus, in this example, the stator 112 includes three windings 113a, 113b, 113c (collectively referred to as the windings 113). FIG. 1C is a schematic circuit diagram of the stator windings 113a, 113b, 113c. In the example of FIG. 1C, the windings 113 are arranged in a Wye configuration. However, other configurations are possible. For example, the windings 113 may be connected in a delta configuration.

Figure 1D:
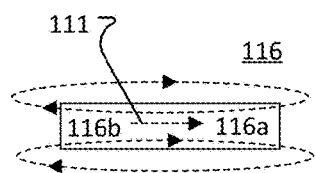
FIG. 1D illustrates magnetic fields of a permanent magnet in a rotor of the motor of FIG. 1A.

Referring again to FIG. 1B, when an alternating current (AC) flows in the stator windings 113a, 113b, 113c, respective rotating stator magnetic fields 115a, 115b, 115c are formed. The flux of each magnetic field 115a, 115b, 115c encircles the respective winding 113a, 113b, 113c. Referring also to FIG. 1D, the rotor 114 includes a permanent magnet 116. The permanent magnet 116 may be embedded within the rotor 114 or mounted on the surface of the rotor 114. The permanent magnet 116 includes a north pole 116a and a south pole 116b at opposite ends. The permanent magnet 116 generates a constant rotor magnetic field 111. The magnetic field lines (shown with a dashed line style in FIG. 1D) of the rotor magnetic field 111 form closed loops that leave at the north pole 116a and enter at the south pole 116b. An interaction between the stator magnetic fields 115a, 115b, 115c and the rotor magnetic field 111 causes the rotor 114 to rotate about the axis 117.

Figure 1E:
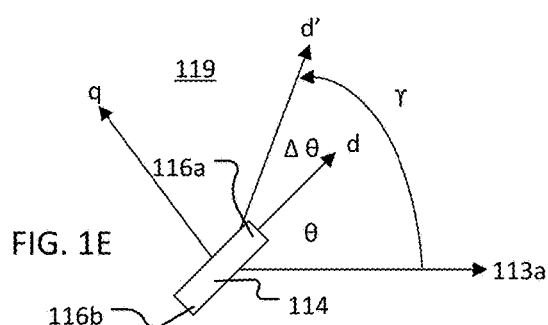
FIG. 1E is a representation of the rotor relative to the stator windings of the motor of FIG. 1A.

FIG. 1E is a representation 119 of the rotor 114 relative to the axis of the magnetic field 115a that encircles the stationary winding 113a. The angular position of the rotor 114 is the angle θ, which is the angle between the axis of the stator winding 113a and a d-axis. The d-axis is an axis that aligns with the direction of magnetic flux through the permanent magnet 116. Thus, the d-axis is a line that passes from the south pole 116b to the north pole 116a. The d-axis indicates the angular position of the rotor 116. For example, when the d-axis aligns with the axis of the winding 113a (such as shown in FIG. 1B), the angular position (θ) is 0 degrees (°). The representation 119 also includes a q-axis, which is orthogonal to the d-axis. Together, the d-axis and the q-axis form a rectangular d-q coordinate system that rotates synchronously with the AC current provided to the stator 112. The stator 112 is stationary and thus the axes of the windings 113a, 113b, 113c are spatially fixed.

As discussed below, a motor control system 130 estimates an initial angular position (θ) of the rotor 114. The initial angular position of the rotor 114 is the angular position of the rotor 114 prior to starting the motor 110. Knowledge of the initial angular position of the rotor 114 is important to the proper operation of the motor 110. For example, the angular positon of the rotor 114 may be needed to ensure that the motor 110 provides the intended torque and/or speed to the load 101.

Some prior systems determine the angular position of the rotor 114 using physical sensors that provide an indication of the position of the rotor 114. However, use of such sensors adds complexity and expense to the system 100. On the other hand, the control system 130 implements an approach that does not rely on position sensors to determine the initial angular position of the rotor 114. The control system 130 instead injects the high-frequency motor driver voltage signal 132 into the system 100. The motor driver voltage signal 132 is injected in the d-q coordinate system at an angle Y relative to the fixed axis of the stator winding 113a.

The motor driver voltage signal 132 is converted into a three-phase voltage signal 135 by a motor driver module 134. One of the three phase components in the three-phase voltage control signal 135 is applied to each of the stator windings 113a, 113b, 113c and respective corresponding currents 118a, 118b, 118c are induced in the motor 110.

A current sensing system 120 (FIG. 1A) senses one or more of the currents 118a, 118b, 118c as a sensed current 118. The current sensing system 120 may include current transformers, Rogowski coils, or any other device capable of measuring an AC current. The current sensing system 120 may include more than one sensing device. For example, the current sensing system 120 may include one current sensor for each phase (for each of the stator windings 113a, 113b, 113c). In some implementations, the current sensing system 120 includes fewer than three current sensors. For example, the current sensing system 120 may include two sensors that measure the current flowing into two of the stator windings. In these implementations, the current flowing into the other stator winding is computed from the currents measured in the two stator windings. The current sensing system 120 determines a current indication for each of the currents 118a, 118b, 118c.

The rotor position determination module 136 analyzes the indication of the sensed current 118 to determine id' and iq', which are the components of the sensed current 118 projected along the d-axis and the q-axis, respectively, of the d-q coordinate system. The rotor position determination module 136 determines the initial position (θ) of the rotor 114 with a proportional integral (PI) regulation technique discussed with respect to FIGS. 3A and 3B. As discussed further with respect to FIGS. 3A-3C, when iq' is zero, the angle Y of the injected motor driver voltage signal 132 is equal to θ, and the initial angular position of the rotor 114 is thus known (because the angle Y is known).

Figure 2A:
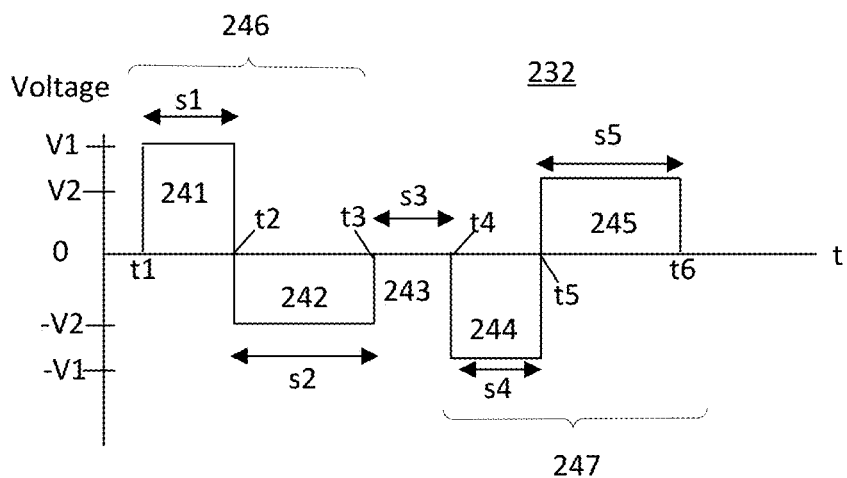
FIG. 2A is a plot of an example of a motor driver voltage signal.

An example of a motor driver voltage signal 232 is shown in FIG. 2A. FIG. 2A shows the voltage level of the motor driver voltage signal 232 as a function of time (t). The motor driver voltage signal 232 is an example of the motor driver voltage signal 132, and the motor driver voltage signal 232 may be provided to the motor driver module 134.

The motor driver voltage signal 232 is a voltage waveform that includes aspects of a square wave. However, the motor driver voltage signal 232 differs from a typical square wave. For example, a typical square wave is a non-sinusoidal periodic waveform in which the amplitude alternates at a constant frequency between fixed minimum and maximum values, with the same temporal duration at the minimum and maximum voltages. The motor driver voltage signal 232 has features that are not present in a typical square wave. For example, the motor driver voltage signal 232 includes a plurality of portions 241-245 that do not alternate between a constant maximum and a constant minimum voltage value at a rate that is constant throughout the signal 232.

Figure 2B:
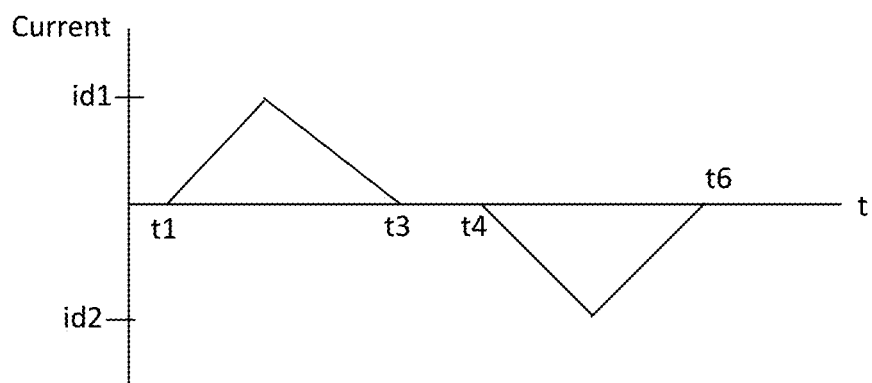
FIG. 2B is a plot of an example of a d axis component of an output current induced by the motor driver voltage signal of FIG. 2A.

Referring also to FIG. 2B, when a positive voltage V1 is applied to the motor 110 for a duration s1, the current id increases. When a negative voltage V2 is applied to the motor 110 for a duration s2 (which is different than s1), the current id decreases. As shown in FIG. 2B, the application of the voltage V2 with the negative polarity brings id to zero. However, due to non-linear characteristics of the construction and arrangement of the components of the motor 110 (for example, the shape of components of the motor 110 and the spatial arrangements of the components relative to each other) and non-linear characteristics of the materials of the motor 110 (for example, the materials that form the stator 112 and the rotor 114), a traditional square wave does not reliably bring id to zero. Accordingly, using a traditional square wave to determine the initial angular position of the rotor 114 may result in inaccurate results. On the other hand, the motor driver voltage signal 232 is not an ordinary square wave and has voltage and temporal duration characteristics that allow the motor driver voltage signal 232 to bring id to zero.

The motor driver voltage signal 232 includes the first portion 241, the second portion 242, the third portion 243, the fourth portion 244, and the fifth portion 245. The portions 241-245 are temporally connected and form a voltage waveform having a voltage profile that is defined by the voltages and temporal durations of the portions 241-245. The first portion 241 has a temporal duration of s1 and a constant voltage of V1 over the duration s1. The second portion 242 has a temporal duration of s2 and a constant voltage of −V2 over the duration s2. The third portion 243 has a temporal duration of s3 and a constant voltage of zero (0) over the duration s3. The fourth portion 244 has a temporal duration of s4 and a constant voltage of −V1 over the duration s4. The fifth portion 245 has a temporal duration of s5 and a constant voltage of V2 over the duration s5.

In greater detail, the voltage of the motor driver voltage signal 232 is initially zero. The first portion 241 occurs from the time t1 to the time t2. Thus, the temporal duration s1 is the time from t1 to t2. At the time t1, which occurs after the time 0, the voltage of the signal 232 increases from zero to the voltage V1. The voltage of the signal 232 remains at the voltage V1 until a time t2, which occurs after the time t1. The second portion 242 begins at the time t2 and ends at a time t3. Thus, the temporal duration s2 is the time from t2 to t3. At the time t2, the voltage of the signal 232 decreases to the −V2 voltage. The voltage of the signal 232 remains at the −V2 voltage until the time t3. At the time t3, the voltage of the signal 232 increases to 0. The voltage of the signal 232 remains at 0 until t4. Thus, the temporal duration s3 is the time from t3 to t4. The fourth portion 244 begins at the time t4 and ends at a time t5. At the time t4, the voltage of the motor driver voltage signal 232 decreases to −V1. The voltage of the motor driver voltage signal 232 remains at −V1 until the time t5. The temporal duration s4 is the time between t4 and t5. The fifth portion 245 begins at the time t5 and ends at the time t6. At the time t5, the voltage of the motor driver voltage signal 232 increases to V2 and remains at V2 until the time t6. At the time t6, the voltage of the motor driver voltage signal returns to 0.

The temporal durations s1 and s2 are different, and the temporal duration s3 may be different from the temporal duration s1 and/or the temporal duration s2. For example, s1 may be 1 millisecond (ms), s2 may be 1.25 ms, and s3 may be 3 ms. Additionally, V1 and V2 are different voltages. For example, V1 may be 285 volts (V), and V2 may be 0.7(V1), or 199.5 V in this example. Thus, the first portion 241 and the second portion 242 have different voltage levels and different polarities. In the example of FIG. 2A, the polarity of the voltage in the first portion 241 is positive and the polarity of the voltage in the second portion 242 is negative. Additionally, the values of V1 and V2 are selected such that id stays within the rated current value of the motor 110. For example, V1 and V2 may be voltages that result in id being no more than 80% of the rated current value of the motor 110. In some implementations, the values of V1 and V2 and/or the durations s1 and s2 may be determined by changing V1, V2, s1, and/or s2 until id reaches a predetermined level (for example, 80% of rated current) and then adjusting V1, V2, s1, and/or s2 until the value of id is zero during the duration s3.

The first portion 241 and the second portion 242 form a first segment 246, and the fourth portion 244 and the fifth portion 245 form a second segment 247. The segments 246 and 247 are separated by the third portion 243. In the example shown in FIG. 2A, the second segment 247 is the same as the first segment 246, except the polarity of the segment 247 is opposite the polarity of the segment 246.

As such, the signal 232 has characteristics that distinguish it from an ordinary square wave. The use of the signal 232 to estimate the initial angular position (θ) of the rotor 114 yields more accurate results than using a traditional square wave. For example, when using the motor driver signal 232, the initial angular position (θ) may be estimated with an average error of about +/−4 degrees (°) or less and a maximum error of about +/−7.7°. In approaches that use a traditional square wave, the average error is generally greater. For example, the maximum error using a traditional square wave may be, for example+/−10° or more.

In the example of FIG. 2A, only the first segment 246 and the second segment 247 are shown. However, the motor driver voltage signal 232 may include additional instances of the first segment 246 and the second segment 247 such that the motor driver voltage signal 232 includes multiple instances of the waveform shown in FIG. 2A over time.

Figure 3A:
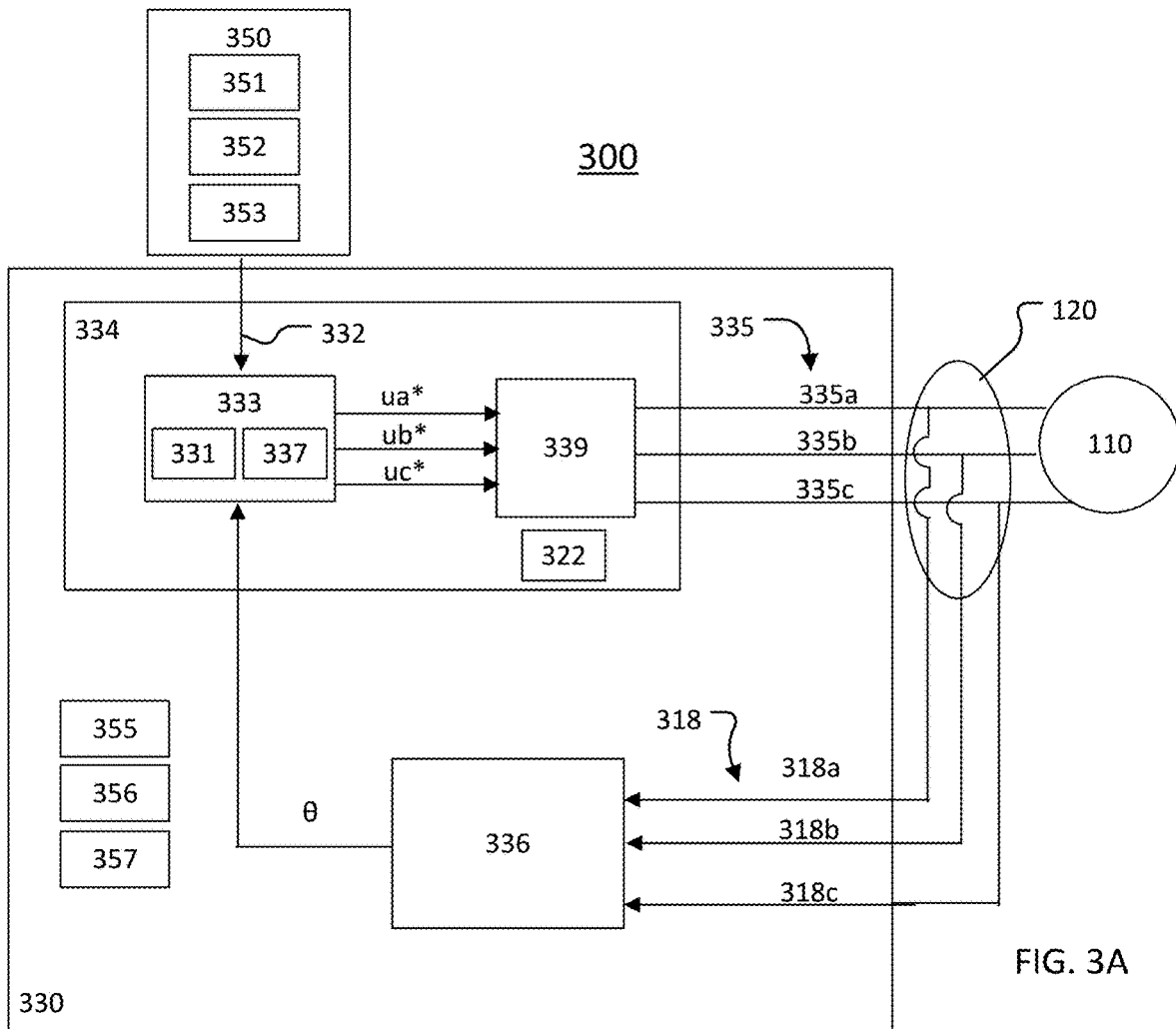
FIG. 3A is a block diagram of a motor system.

FIG. 3A is a block diagram of a motor system 300. The motor system 300 includes a motor control system 330 that controls the motor 110 and estimates an initial angular position (θ) of the rotor 114. The motor control system 330 is an example of the motor control system 130 of FIG. 1A.

The motor control system 330 includes various modules, some or all of which may be implemented as software programs that control various electronic elements. For example, the modules included in the motor control system 330 may be implemented as software programs that control switching elements (such as transistors) or other electronic components, such as operational amplifiers. Moreover, the software programs may implement computationally complex operations that allow for vector control of the motor 110.

The motor control system 330 includes an electronic processing module 355, an electronic storage 356, and an input/output (I/O) interface 357. The electronic processing module 355 includes one or more electronic processors. The electronic processors of the module 355 may be any type of electronic processor and may or may not include a general purpose central processing unit (CPU), a graphics processing unit (GPU), a microcontroller, a field-programmable gate array (FPGA), Complex Programmable Logic Device (CPLD), and/or an application-specific integrated circuit (ASIC).

The electronic storage 356 may be any type of electronic memory that is capable of storing data and instructions in the form of computer programs or software, and the electronic storage 356 may include volatile and/or non-volatile components. The electronic storage 356 and the processing module 355 are coupled such that the processing module 355 is able to access or read data from and write data to the electronic storage 356.

The I/O interface 357 may be any interface that allows a human operator and/or an autonomous process to interact with the control system 330. The I/O interface 357 may include, for example, a display (such as a liquid crystal display (LCD)), a keyboard, audio input and/or output (such as speakers and/or a microphone), visual output (such as lights, light emitting diodes (LED)) that are in addition to or instead of the display, serial or parallel port, a Universal Serial Bus (USB) connection, and/or any type of network interface, such as, for example, Ethernet. The I/O interface 357 also may allow communication without physical contact through, for example, an IEEE 802.11, Bluetooth, or a near-field communication (NFC) connection. The control system 330 may be, for example, operated, configured, modified, or updated through the I/O interface 357.

The I/O interface 357 also may allow the motor control system 330 to communicate with systems external to and remote from the system 300. For example, the I/O interface 357 may include a communications interface that allows communication between the motor control system 330 and a remote station (not shown), or between the control system 330 and a separate monitoring apparatus. The remote station or the monitoring apparatus may be any type of station through which an operator is able to communicate with the motor control system 330 without making physical contact with the motor control system 330. For example, the remote station may be a computer-based work station, a smart phone, tablet, or a laptop computer that connects to the motor control system 330 via a services protocol, or a remote control that connects to the control system 330 via a radio-frequency signal.

The motor control system 330 includes a motor driver module 334 that provides three-phase electrical power 335 to the motor 110 based on a motor driver voltage signal 332. The motor driver voltage signal 332 may have a temporal voltage profile (for example, voltage amplitude as a function of time) similar to the motor driver voltage signal 232 (FIG. 2A). The motor driver voltage signal 332 is a high-frequency signal that is injected at an angle Y relative to the spatially fixed windings 113 of the stator 112. The motor control system 330 determines the initial position (θ) of the rotor 114 by measuring a three-phase current 318 generated in the motor 110 in response to application of the motor driver voltage signal 332 and analyzing the measured current 318 in the d-q coordinate system. In particular, the motor control system 330 minimizes the q-axis current such that Δθ becomes zero and the value of Y is equal to θ, and the initial position (θ) is thus known.

In the example of FIG. 3A, the motor driver voltage signal 332 is generated by a signal generation system 350. The signal generation system 350 includes an electronic processor 351, an electronic storage 352, and an input/output interface 353. The signal generation system 350 may be, for example, a function generator that is capable of generating voltage signals based on specifications provided by an operator or based on instructions stored in the electronic storage 352. For example, the instructions may indicate characteristics of the motor voltage control signal such as the amplitude of the motor control voltage signal 332 as a function of time. Although the signal generation system 350 is shown as being a separate item in FIG. 3A, in some implementations, the functionality of the signal generation system 350 may be implemented using the electronic processing module 355, the electronic storage 356, and/or the I/O interface 357.

The motor driver voltage signal 332 is provided to the motor driver module 334. The motor driver module 334 includes a modulation module 333 and an inverter 339. The modulation module 333 transforms the motor driver voltage signal 332 into a three-phase voltage command signal ua*, ub*, uc* that is provided to the inverter module 339. The modulation module 333 includes a transformation module 331 that transforms the motor driver voltage signal 332 from the d-q coordinate system into a voltage signal that has components along two stationary axes. For example, the transformation module 331 may implement the inverse of the Park or d-q transformation to determine transformed voltages uα* and uβ*, which represent the motor driver voltage signal 332 in a two-dimensional stationary α-β coordinate system.

Figure 3C:
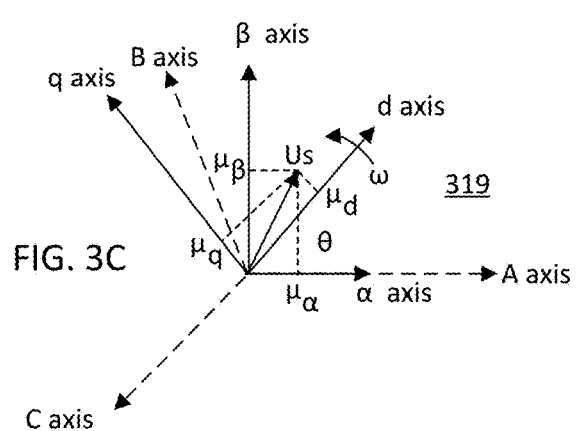
FIG. 3C is a representation of a motor.

An overview of the Park transformation and a Clark transformation is provided prior to discussing the motor driver module 334 in greater detail. Referring also to FIG. 3C, a representation 319 of the motor 110 is shown. In the representation 319, the vector Us represents the high-frequency test signal (such as the motor driver voltage signal 332) that is input into the motor 110 at the angle Y. The components uα, uβ are the projections of Us onto the α and β axes, respectively. The components ud, uq are projections of Us onto the d and q axes. These various components are discussed below.

The representation 319 includes the d axis, which is aligned with the direction of magnetic flux through the permanent magnet 116, and the q axis, which is orthogonal to the d axis. The d axis and the q axis define the d-q coordinate system. In the representation 319, the d-q coordinate system is superimposed on an A axis, a B axis, and a C axis. The A, B, and C axes are stationary axes that correspond to the stator windings 113a, 113b, 113c, respectively. The motor 110 is powered by applying a three-phase voltage signal to the stator 112, with a voltage of a different phase being applied to each winding 113a, 113b, 113c such that a three-phase current is induced. Using the Clark transformation, the three-phase voltage applied to the stator 112 may be decomposed into two orthogonal current components, a component uα along the α axis and a component uβ along the β axis (which is orthogonal to the α axis). The Clark transformation projects a three-phase quantity (such as the current flowing in the windings 113a, 113b, 113c or the voltage applied to the windings 113a, 113b, 113c) onto a two-dimensional stationary coordinate system defined by the α axis and the β axis. The Clark transformation is shown in Equation (1):

$$i_{\alpha\beta} = \frac{2}{3}\begin{bmatrix} 1 & -\frac{1}{2} & -\frac{1}{2} \\ 0 & \frac{\sqrt{3}}{2} & -\frac{\sqrt{3}}{2} \end{bmatrix}\begin{bmatrix} i_a \\ i_b \\ i_c \end{bmatrix},$$ Equation (1)

where ia, ib, ic are the instantaneous currents in the windings 113a, 113b, 113c, respectively, and $i_{\alpha\beta}$ is a vector that includes a component along the α axis and a component along the β axis. The Park transformation rotates the stationary α, β axes at a frequency ω. The Park transformation is shown in Equation (2):

$$i_{dq} = \begin{bmatrix} \cos(\theta) & \sin(\theta) \\ -\sin(\theta) & \cos(\theta) \end{bmatrix}\begin{bmatrix} i_\alpha \\ i_\beta \end{bmatrix},$$ Equation (2)

where $i_{dq}$ is a vector that includes a component along the d axis and a component along the q axis, and θ is the angular position of the rotor 114.

The Clark transformation may be inverted to determine a three-phase quantity based on components in the two-dimensional αβ stationary coordinate system. The inverse of the Clark transformation is called the inverse Clark transformation. The Park transformation may be inverted to determine components in the two-dimensional stationary αβ coordinate system based on components in the rotating d-q coordinate system. The inverse of the Park transformation is referred to as the inverse Park transformation. Although Equations (1) and (2) are illustrated with current values, the Park and Clark transformations also may be applied to transform other quantities, such as voltage values.

Returning to FIG. 3A, the motor driver module 334 also may include a modulation module 337 that generates the three-phase voltage command signal ua*, ub*, uc* from the transformed voltages uα* and uβ* using a space vector pulse width modulation (SVPWM) technique. The modulation module 333 and the transformation module 331 may be implemented as a software module. For example, the electronic storage 356 may include instructions that, when executed by the electronic processing module 355, perform the coordinate transformations indicated above.

The three-phase voltage command signal ua*, ub*, uc* is provided to the inverter 339. The inverter 339 may be, for example, a pulse width modulation (PWM) inverter. The inverter 339 generates the three-phase voltage signal 335 based on the three-phase voltage command signal ua*, ub*, uc*. For example, the inverter 339 may include three half-bridge circuits that each include two switching elements (such as, for example, power transistors) connected in series. Each pair of switching elements receives a direct-current (DC) voltage from a DC power source 322 (for example, a battery, DC power supply, or other source of DC power). In these implementations, the inverter 339 generates a pulse width modulated (PWM) signal for each of the three phases by applying signals based on the three-phase voltage command signal to each pair of switching elements. The DC voltage provided by the DC power source 322 is converted to pulse width modulated three-phase AC voltage signals by the switching operations of the half-bridge circuits.

The output of the inverter 339 is the voltage signal 335. The three-phase voltage signal 335 includes phase components 335a, 335b, 335c. The voltage signal 335 is applied to the motor 110, and the three-phase current 318 flows in the stator 112, with the component 335a being applied to the winding 113a, the component 335b being applied to the winding 113b, and the component 335c being applied to the winding 113c.

The current sensing system 120 measures the three-phase current 318 and provides indications of currents 318a, 318b, 318c, which are the instantaneous currents in each phase, to the initial rotor position determination module 336. The initial rotor position determination module 336 estimates the initial position (θ) of the rotor 114 based on the indications of the measured currents 318a, 318b, 318c.

Figure 3B:
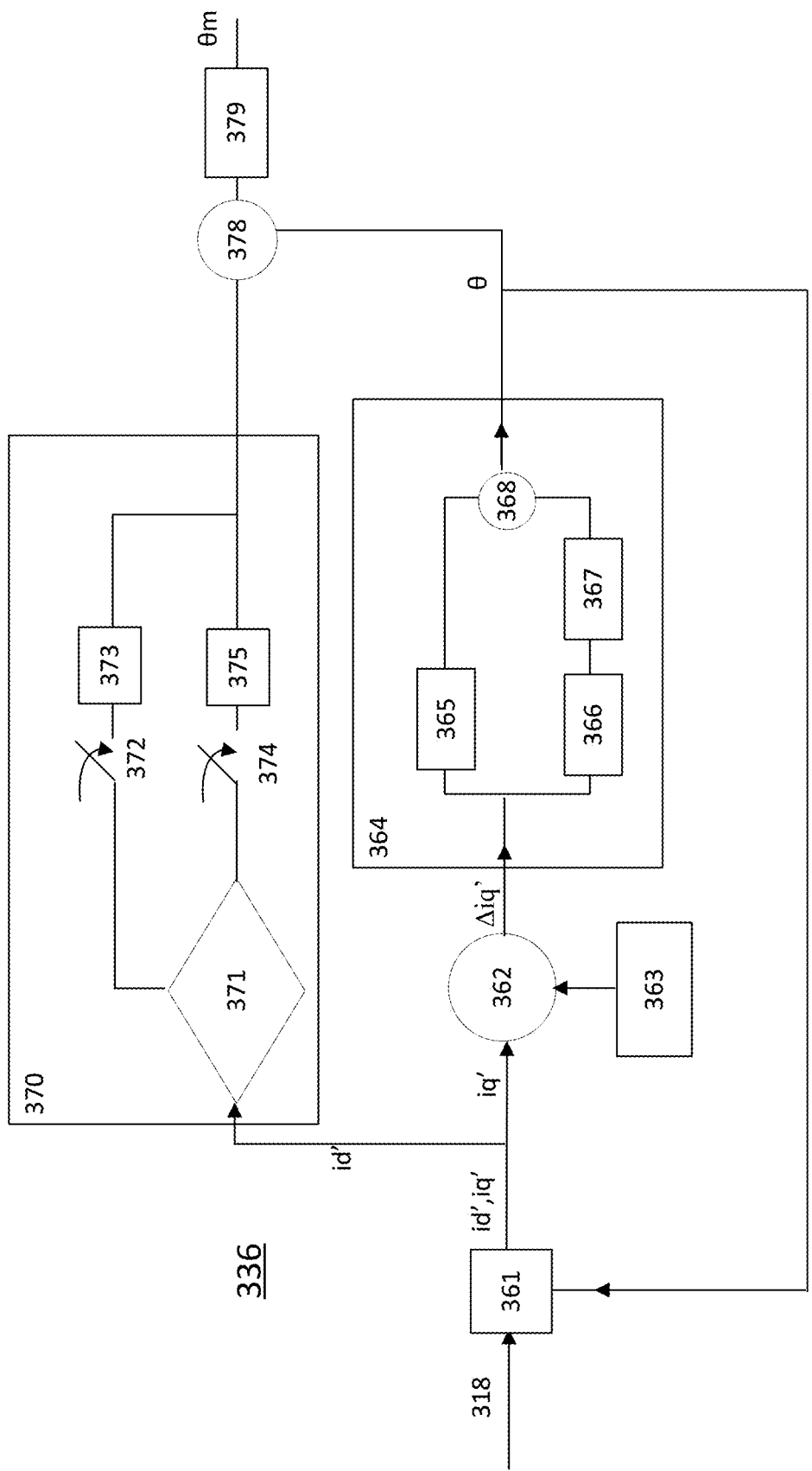
FIG. 3B is a block diagram of an initial rotor position determination module that may be used in the motor system of FIG. 3A.

Referring also to FIG. 3B, a block diagram of the initial rotor position determination module 336 is shown. The initial rotor position determination module 336 includes a transformation module 361 that receives the indication of the current 318. The indication of the current 318 includes indications of the instantaneous current 318a, 318b, 318c. For example, the indication of the instantaneous current 318a, 318b, 318c may be information, such as numerical data, that indicates the amplitude of the instantaneous current measured by the current sensing system 120 at a particular time. The transformation module 361 converts the indications of the instantaneous current 318a, 318b, 318c into a current component on the d-axis and a component on the q-axis. For example, the transformation module 361 may implement the Clark or α-β transformation that transforms the indication of the three-phase instantaneous current into two current components in a stationary rectangular two-dimensional coordinate system followed by the Park or d-q transformation that transforms the two α-β current components into the d-q coordinate system. The transformation module 361 may be implemented as a software module. For example, instructions to perform the coordinate transformations used by the transformation module 361 may be stored on the electronic storage 356 and executed by the processing module 355.

Figure 2C:
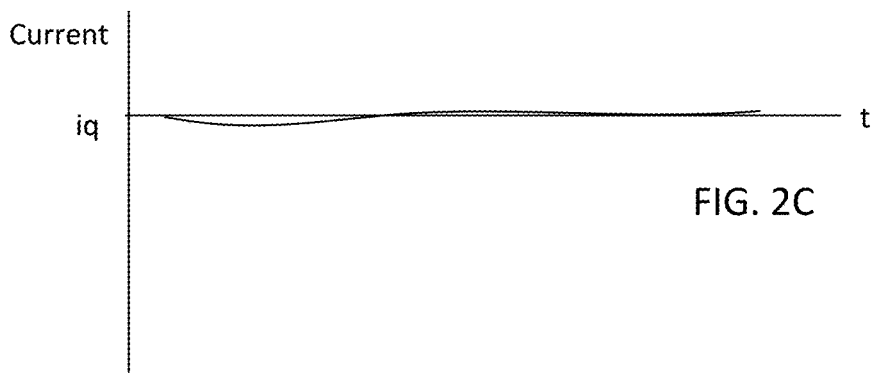
FIG. 2C is a plot of an example of a q axis component of an output current induced by the motor driver voltage signal of FIG. 2A.

The current components on the d-axis and the q-axis determined from the measured current 318 by the transformation module 361 are referred to as id', iq' or as the id', iq' current components. Although the id' and iq' are instantaneous current values, the id' and iq' currents exist at other times during which the motor driver voltage signal 332 is applied to the motor 110. For example, FIG. 2B shows an example of the amplitude of the id' current as a function of time, and FIG. 2C shows an example of the amplitude of the iq' current as a function of time.

The iq' current component is compared to a target value 363 at a comparator 362 to determine an error value. The comparator 362 may be implemented in software or hardware, and the comparator 362 is configured to determine an absolute value of the difference between the target value 363 and the iq' current. Thus, the error value is the absolute value of the difference between target value and the iq' component. The error value is represented as Δiq'. Equations (3)-(5) illustrate the relationship between Δiq' and Δθ. Referring also to FIG. 1E, Δθ is the angular error between the angle of the injected motor driver voltage signal 332 and the d-axis.

Equation (3) represents the current response of the motor 110 in response to an injected high-frequency voltage signal, such as the motor driver voltage signal 332:

$$p\begin{bmatrix} i_{d'} \\ i_{q'} \end{bmatrix} = \frac{1}{L_0^2 - \Delta L^2}\begin{bmatrix} -\Delta L\cos 2\Delta\theta + L_0 & \Delta L\sin 2\Delta\theta \\ \Delta L\sin 2\Delta\theta & \Delta L\cos 2\Delta\theta + L_0 \end{bmatrix}\begin{bmatrix} u_{d'} \\ u_{q'} \end{bmatrix},$$

Equation (3)

where $$L_0 = \frac{L_d + L_q}{2}, \Delta L = \frac{L_d - L_q}{2}, \begin{bmatrix} u_{d'} \\ u_{q'} \end{bmatrix}$$

is the motor driver voltage signal 332, and Δθ is the angle between ud' and d, as shown in FIG. 1E. $L_d$ and $L_q$ represent the inductances of the motor 110 along the d-axis and the q-axis, respectively. The motor driver voltage signal 332 is $$\begin{cases} u_{d'} = U_h \\ u_{q'} = 0 \end{cases},$$

Equation (4)

where Uh has a temporal voltage profile such as shown in FIG. 2A. Substituting Equation (4) into Equation (3) and integrating over a time period results in:

$$\Delta i_q' = K\Delta\theta$$

Equation (5), where Δiq' is the error value determined at 362 and K is a gain constant. When Δiq'=0, Δθ=0 and Y (which is the angle at which Uh is injected relative to the windings 113) is the same as the angle (θ) of the rotor 114. Thus, by regulating Δiq' to 0, the initial angular position (θ) of the rotor 114 is determined. The PI control module 364 implements Equation (5) and outputs an estimate of Δθ, from which the initial position (θ) of the rotor 114 may be determined. The PI control module 364 also keeps the initial rotor determination module 336 stable under all operating conditions.

The PI control module 364 regulates Δiq' to the target value 363, which may be 0. The PI control module 364 includes an amplifier 365, an amplifier 366, and an integrator 367. The amplifier 365 has a gain constant of Kp. The amplifier 366 has a gain constant of Ki. The gain constants Kp and Ki are numerical values that are greater than 0. The Δiq' value is multiplied by the gain constant Kp to produce Kp*Δiq'. The quantity Kp*Δiq' is provided to an adder 368. The Δiq' value is also provided to the amplifier 366, which multiplies the Δiq' value by the gain constant Ki to produce a quantity Ki*Δiq'. The integrator 367 integrates (Δiq'*Ki) and provides the integrated result to the adder 368. Ki may be, for example, 3.0. Kp may be, for example, 1.0.

The Δiq' value is related to Δθ as shown in Equation (5). By adding the output of the amplifier 365 and the output of the integrator 367, the adder 368 determines an estimate of θ. Referring to FIG. 1E, θ=Y−Δθ, where Y is the angle at which the motor control voltage signal 332 was injected relative to the windings 113 of the stator 112. When Δiq' is regulated to be zero by PI control module 364, Δθ is then equal to zero. Thus, the estimate of θ from the adder 368 is equal to the angular position of the rotor 114.

The estimate of θ is fed back to the transformation module 361. An indication of the current in another sample of the three-phase current 318 is provided to the transformation module 361. The indication represents the three-phase current 318 at a later time and is represented as ia'_2, ib'_2, and ic'_2. The estimate of θ is used to transform the instantaneous current values ia'_2, ib'_2, and ic'_2 into components in the stationary α,β coordinate system and components on the d-axis and the q-axis of the rotating d-q coordinate system. These transformed values are referred to as id'_2 and iq'_2, respectively. The value iq'_2 is compared to the reference 363 and the result is regulated by the PI regulator 364 as discussed above.

The initial rotor position determination module 336 also includes a rotation direction determination module 370 that determines a direction of rotation of the rotor 114. Referring also to FIG. 1B, the rotor 114 may rotate about the axis 117 in a clockwise or counterclockwise direction. The rotation direction determination module 370 includes a comparison module 371. The comparison module 371 analyzes id' (the d-axis component of the three-phase current 318) by comparing id'_1 to id'_2. For example, id'_2 may be the d-axis component of the three-phase current 318 at a second time, and id'_1 may be the d-axis component of the three-phase current 318 at a first time that occurs before the second time. If the component id'_1 is greater than the component id'_2, the comparison module 371 closes a switch 372 such that a constant value 373, which is equal to 0, is connected to an adder 378. The comparison module 371 also ensures that a switch 374 is open such that a constant value 375, which is equal to pi radians or 180 degrees (°) is not connected to the adder 378. If the component id'_1 is less than the component id_2, the comparison module 371 closes the switch 374 and opens the switch 372 such that the constant value 375 is connected to the adder 378 and the constant value 373 is not connected to the adder 378.

To determine θm, which is the final estimate of the angular position of the rotor 114, θ is provided to the adder 378, and the direction determination module 370 provides either the constant value 373 or the constant value 375 to the adder 378. The adder 378 adds the constant value 373 or the constant value 375 to the value of θ to determine θm. In the example of FIG. 3C, the initial position determination module 336 also includes a low-pass filter 379. The output of the adder 378 is provided to the low-pass filter 379. The low-pass filter 379 filters the output of the adder 378 to remove high-frequency noise that may interfere with the proper operation of the system 300. The low-pass filter 379 may be implemented in hardware or as a software module.

Figure 4A:
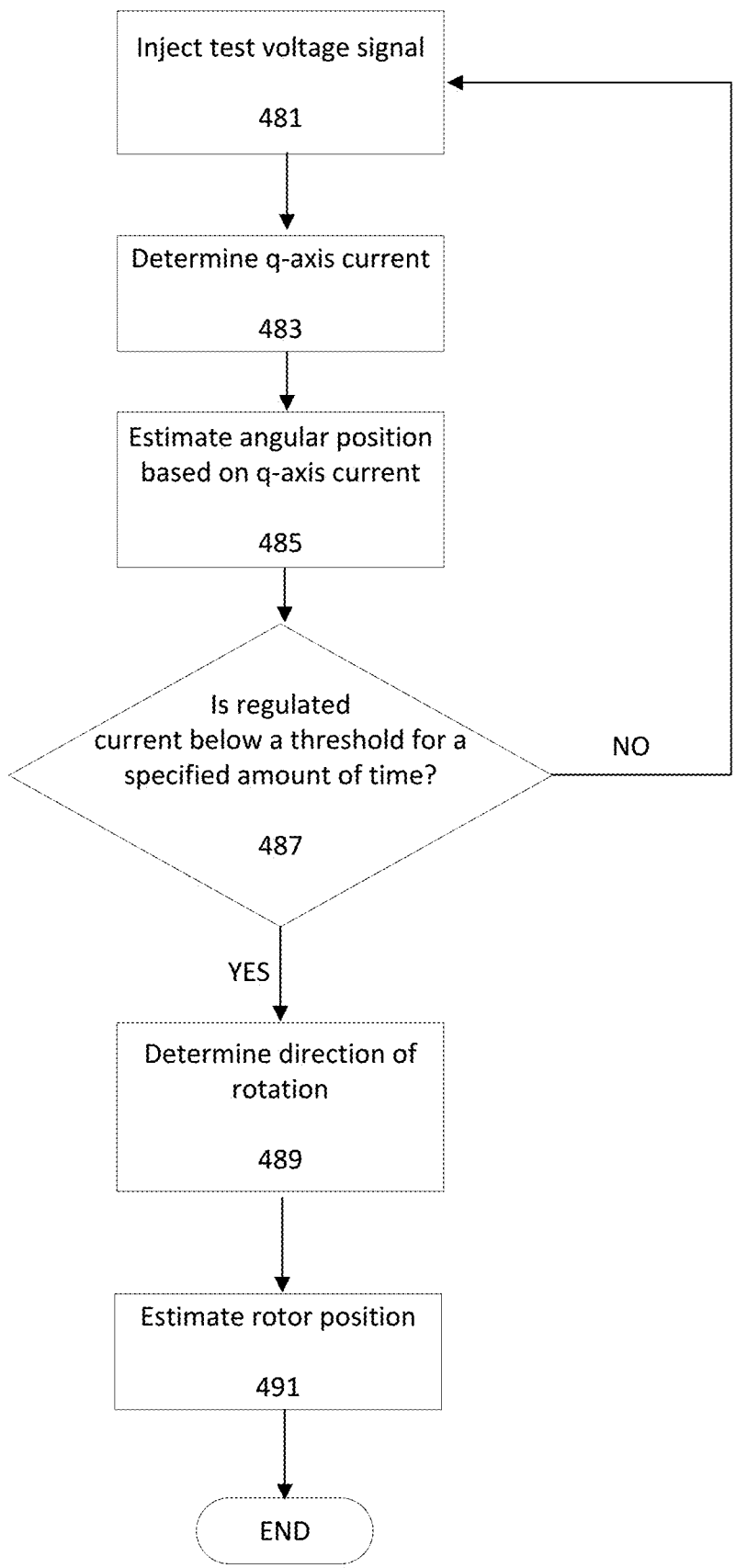
FIG. 4A is a flow chart of an example process for determining an estimate of an initial angular position of a rotor.

FIG. 4A is a flow chart of an example process 480 for determining an estimate of an initial angular position of the rotor 114. The process 480 may be performed by the electronic processing module 355 and the initial rotor position determination module 336 of the control system 330. The process 480 is discussed with respect to the initial rotor position determination module 336 and the motor driver voltage signal 232 of FIG. 2A. However, the process 480 may be performed by other motor control systems that control a permanent magnet synchronized machine.

A test voltage signal is injected (481). The test voltage signal is the motor driver voltage signal 232 shown in FIG. 2A. The motor driver voltage signal 232 is injected at an angle Y relative to the stator windings 113. The motor control voltage signal 232 is modulated and/or transformed and used to form the voltage control signal 335, which is applied to the motor 110. The three-phase current 318 flows in the motor 110.

A q-axis current component, iq', is determined based on an indication of characteristics of the measured three-phase current 318 (483). For example, the q-axis current component iq' is determined by projecting the measured three-phase current 318 into a two-dimensional rectangular coordinate system ($\alpha$-$\beta$) and then projecting the two-dimensional components into the d-q coordinate system to determine iq'.

An angular position ($\theta$) of the rotor 114 is estimated based on iq' (485). For example, iq' determined in (483) may be compared to the target value 363 to determine a q-current error metric ($\Delta$iq'). The q-current error metric ($\Delta$iq') may be determined as the absolute value of the difference between iq' and the target value 363. The q-current error metric ($\Delta$iq') is regulated such that the error metric is reduced using the PI control module 364. The target value 363 may be, for example, zero.

The PI control module 364 determines a plurality of instances of the q-current error metric ($\Delta$iq') over time. The instances of the q-current error metric ($\Delta$iq') over a pre-determined period of time are evaluated (487) relative to a threshold value. The threshold value indicates how close $\Delta$iq' should be to the target value 363. The pre-determined amount of time and the threshold values may be stored on the electronic storage 356. The pre-determined amount of time is selected as a time that allows the system 300 to operate reliably and with stability. For example, the determined amount of time is set to be sufficiently long that a plurality of samples of the q-current error metric are collected. The pre-determined amount of time and/or the threshold values may be constant and unchanging during the lifetime of the motor control system 330, or may be adjustable by an operator of the motor control system 330 via the I/O interface 357.

If the q-current error metric ($\Delta$iq') is equal to or below a threshold value for the pre-determined amount of time, then the estimate of $\Delta\theta$ determined by the PI control module 364 is deemed useable, and an estimate of $\theta$ is determined based on $\Delta\theta$ and Y. The direction of rotation of the rotor 114 is determined (489) using the rotation direction determination module 370. The initial angular position ($\theta$m) of the rotor 114 is determined by adding the output of the determination module 370 to the estimate of $\theta$ (491).

If the q-current error metric ($\Delta$iq') is not equal to or below the threshold value for the pre-determined amount of time, then the process 480 returns to (481) and another instance of the motor driver voltage signal 232 is injected into the motor 110. The other instance of the motor driver voltage signal 232 may be injected into the motor 110 at a different angle Y. The process 480 continues at (481)-(487) until the q-current error metric ($\Delta$iq') is equal to or below the threshold value for a pre-determined amount of time or until the process 480 is halted by an operator of the motor control system 330.

Figure 4B:
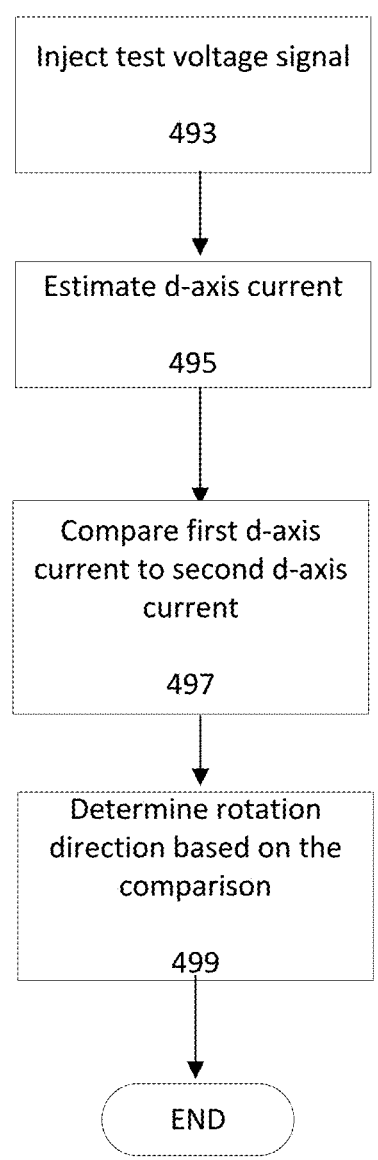
FIG. 4B is a flow chart of an example of a process for determining a direction of rotation of a rotor.

FIG. 4B is a flow chart of a process 489. The process 489 may be performed by the rotation direction determination module 370. The determination module 370 may be implemented as a collection of instructions stored on the electronic storage 356. When executed, the instructions cause the electronic processing module 355 to perform the process 489.

The test voltage signal is injected (493). The test voltage signal may be, for example, the motor driver voltage signal 232 (FIG. 2A). The d-axis current id' is estimated by projecting the measured current 318 onto the d-axis of the d-q coordinate system (495). More than one d-axis currents are determined, each at a different time. A first d-axis current (id'_1) is compared to a second d-axis current (id'_2) (497). The second d-axis current (id'_2) is determined from current that flows in the winding 113 at a later time.

The direction of rotation and the angular position ($\theta$m) of the rotor 114 is determined based on the comparison (499). If id'_1 is greater than id'_2, the rotor 114 is rotating in a clockwise direction, and the angular position ($\theta$m) is the value of ($\theta$) from 364. If id'_1 is less than id'_2, the angular position ($\theta$m) of the rotor 114 is the value of ($\theta$) plus pi in radians or 180 degrees depending on the units of $\theta$.

FIG. 5 is a table 500 of example experimental results. The results in table 500 show the ability of the motor control system 330 to determine the initial rotor position of a rotor in a synchronous machine similar to the motor 110. The results in table 500 were obtained with a motor driver voltage signal similar to the signal 232 (FIG. 2A), with V1=285V, and V2=199.5V. The motor used to collect the data shown in table 500 was a surface mounted permanent magnet motor.

The table includes results for applying the motor control system 300 to estimate the initial rotor angle. The rotor was placed at 11 different initial rotor angles (shown in degrees in the left-most column) and the estimated initial position was then determined using the motor control system 330. For each different initial rotor angle, the technique for determining the initial rotor angular position based on the control system 330 was performed six different times, with each of the six different times being a different test. The resulting estimated initial rotor angles are shown in degrees in the columns under the heading labeled "Identification Results (°)," and the results from each individual test are under the columns labeled as test1, test2, test3, test4, test5, test6. Thus, for each initial angle shown in the left-most column, the initial angle was estimated by the motor control system 300 six times.

As shown in the table 500, the maximum average error and the maximum error over all of the tests and all of the 11 known initial angles occurred at the initial angle of 180°. The maximum average error was 3.1°, and the maximum error different conditions was 7.7°.

The same experiment was conducted at five different times over 11 different angles with a traditional square wave. Like the results shown in FIG. 5, when using the traditional square wave instead of a signal such as the motor driver voltage signal 232, the maximum error and maximum average error occurred for the initial angle of 180°. However, when using the traditional square wave, the maximum average error was 7.3° and the maximum error was 13.4°. Thus, the maximum average error when using the traditional square wave was more than twice the maximum average error when using a signal such as the motor driver voltage signal 232.

Figure 6:
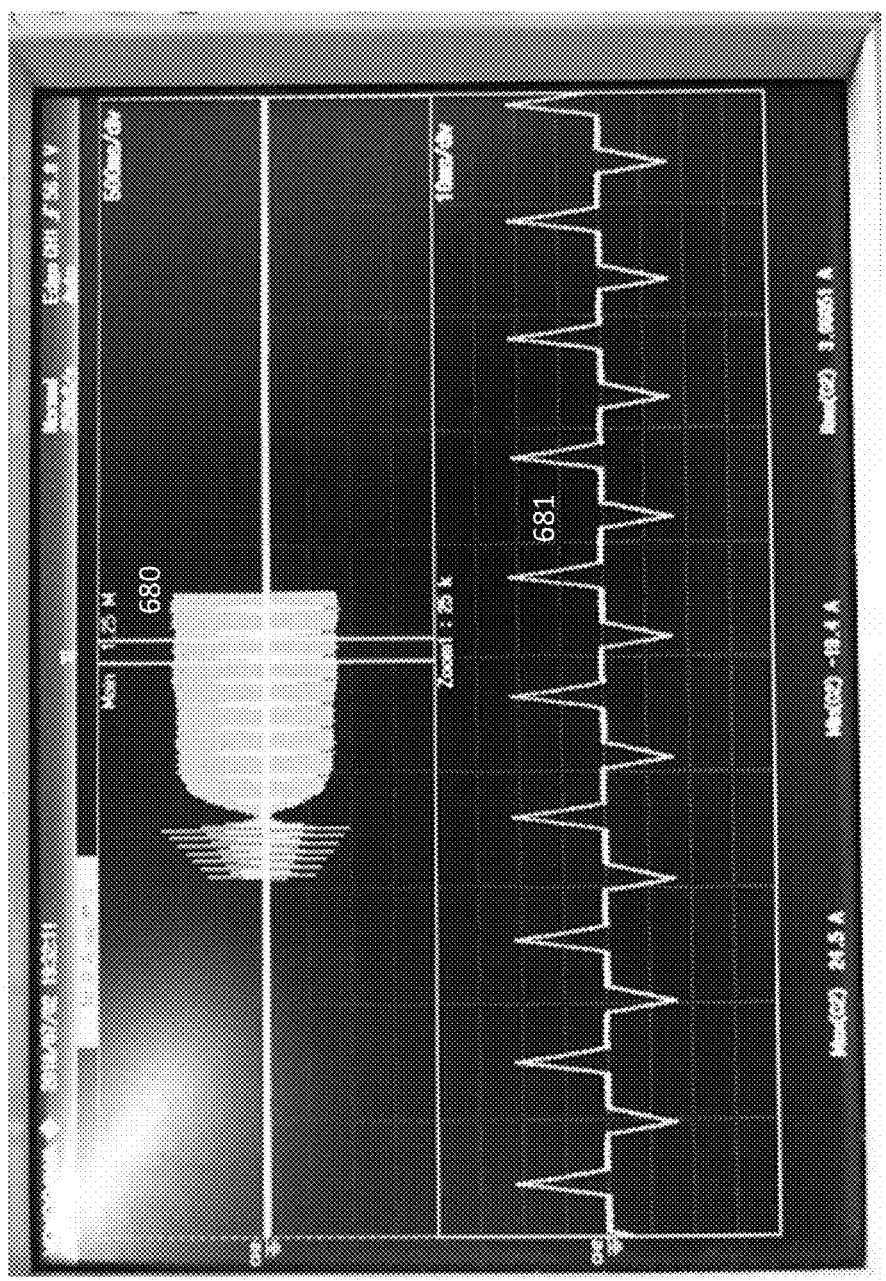

FIG. 6 shows an example of a measured d axis output current 680 of a permanent magnet synchronous motor when a motor driver voltage signal such as the signal 232 is applied. Prior to measuring the output current 680 shown in FIG. 6, the values of V1 and V2 of the motor driver voltage signal were gradually increased while the output current id was measured until the output current 680 reached about 80% of the rated current of the motor and the output current id became zero in duration s3. As shown in FIG. 2A, at during the duration s3, the voltage of the motor driver voltage signal is zero or V2 is removed. In this way, the V1 and V2 for drive voltage signal are determined. In FIG. 6, the output current 680 is plotted on a time scale that is 500 ms per division. A waveform 681 shows the output current 680 plotted on a time scale that is 10 ms per division. Thus, the waveform 681 is a zoom-in or magnified version of the output current 680 and shows the details of output current 680. The output current 680 includes regions in which the current id becomes zero, similar to what is shown in FIG. 2B.

The motor driver voltage signal with the determined V1 and V2 was applied to the motor and iq was regulated to zero, as discussed above with respect to FIGS. 3A and 3B.

Other implementations are within the scope of the claims.

What is claimed is:

1. A system comprising:
   a motor driver module configured to provide a motor driver voltage signal to a synchronous machine, the motor driver voltage signal being sufficient to induce an electrical current in the synchronous machine; and
   a rotor position determination module configured to: receive an indication of the electrical current induced in the machine; convert the indication into a d-axis current component and a q-axis current component, the d-axis current component and the q-axis current component being associated with a rotating rectangular coordinate system defined by a d-axis and a q-axis; and determine an initial position of the rotor based on the d-axis current component and/or the q-axis current component, wherein
   the motor driver voltage signal comprises at least a first portion, a second portion, and a third portion,
   the first portion has a first non-zero voltage during a first temporal duration, the second portion has a second non-zero voltage during a second temporal duration, and the third portion has a substantially zero voltage during a third temporal duration,
   the first portion has a first polarity and the second portion has a second polarity that is opposite to the first polarity, and
   the first temporal duration and the second temporal duration are different.

2. The system of claim 1, wherein the third temporal duration is different from the first temporal duration or the second temporal duration.

3. The system of claim 1, wherein the third temporal duration is different from the first temporal duration and the second temporal duration.

4. The system of claim 1, wherein the first non-zero voltage and the second non-zero voltage are different.

5. The system of claim 1, wherein
   the motor driver voltage signal comprises a first segment and a second segment that occurs before or after the first segment,
   the first segment comprises the first portion and the second portion,
   the second segment comprises a fourth portion and a fifth portion,
   the fourth portion has the first non-zero voltage, the first temporal duration, and the second polarity, and
   the fifth portion having the second non-zero voltage and the first polarity.

6. The system of claim 1, further comprising:
   a modulation apparatus configured to receive electrical power from a direct-current power source and to convert the electrical power into the motor driver voltage signal.

7. The system of claim 1, wherein the indication of the current induced in the synchronous machine comprises an indication of a current drawn by each of three phases of the synchronous machine, and the rotor position determining module comprises:
   a transformation module configured to convert the indication into the d-axis current component and the q-axis current component;
   a regulator module configured to compare the q-axis current component to a reference and to determine a first estimate of a rotational angle of the rotor;
   a comparator module configured to compare the d-axis current component to a prior d-axis current component and to determine a direction of rotation of the rotor based on the comparison; and
   a position determination module configured to estimate the position of the rotor based on the first estimate of the rotational angle of the rotor and the direction of rotation of the rotor.

8. The system of claim 1, wherein the second portion is between the first portion and the third portion.

9. The system of claim 1, wherein the second temporal duration is greater than the first temporal duration.

10. A method comprising:
   generating a motor driver voltage signal comprising at least a first portion, a second portion, and a third portion, wherein the first portion has a first non-zero voltage during a first temporal duration, the second portion has a second non-zero voltage during a second temporal duration, and the third portion has a substantially zero voltage during a third temporal duration; the first portion has a first polarity and the second portion has a second polarity that is opposite to the first polarity; and the first temporal duration and the second temporal duration are different;
   applying the motor driver voltage signal to a synchronous machine;
   measuring an induced current in the motor after applying the motor driver voltage signal to the synchronous machine;
   determining a d-axis current component and a q-axis current component based on the measured induced current; and
   determining the initial angular position of the rotor based on the d-axis current component and/or the q-axis current component.

11. The method of claim 10, wherein measuring an induced current comprises measuring an induced current in each of three phases, and the method further comprises:
- determining the q-axis current component from the measured induced current in each of the three phases;
- determining an error metric by comparing the determined q-axis current component to a reference q-axis current component;
- regulating the q-axis current to reduce the error metric;
- determining whether the error metric is less than a threshold error metric for a test temporal period;
- if the error metric is less than the threshold error metric for the test temporal period, determining a direction of rotation of the rotor; and
- if the error metric is not less than the threshold error metric for the test temporal period, applying the motor driver voltage signal to the synchronous machine.

12. The method of claim 11, wherein determining a direction of rotation of the rotor comprises comparing the d-axis current component to a previous d-axis current component.

13. The method of claim 11, wherein the reference q-axis current component comprises a value of zero.

14. The method of claim 10, wherein the first non-zero voltage and the second non-zero voltages are different.

15. The method of claim 10, wherein:
- the motor driver voltage signal comprises a first segment and a second segment that occurs before or after the first segment,
- the first segment comprises the first portion and the second portion,
- the second segment comprises a fourth portion and a fifth portion,
- the fourth portion has the first non-zero voltage, the first temporal duration, and the second polarity, and
- the fifth portion having the second non-zero voltage and the first polarity.

16. The method of claim 15, wherein the first non-zero voltage and the second non-zero voltages are different.

17. The method of claim 10, wherein the second portion is between the first portion and the third portion.

18. A system for determining an initial angular position of a rotor of a synchronous machine, the system comprising:
- a motor driver module configured to provide a motor driver voltage signal to the synchronous machine, the motor driver voltage signal being sufficient to induce an electrical current in the synchronous machine; and
- a rotor position determination module configured to: receive an indication of the current induced in the machine and to determine the initial position of the rotor based on the indication of the current induced in the machine, wherein the indication of the current induced in the synchronous machine comprises an indication of a current drawn by each of three phases of the synchronous machine, and the rotor position determining module comprises:
  - a transformation module configured to convert the indication into a d-axis current component and a q-axis current component, the d-axis current component and the q-axis current component being associated with a rotating rectangular coordinate system defined by a d-axis and a q-axis;
  - a regulator module configured to compare the q-axis current component to a reference and to determine a first estimate of a rotational angle of the rotor;
  - a comparator module configured to compare the d-axis current component to a prior d-axis current component and to determine a direction of rotation of the rotor based on the comparison; and
  - a position determination module configured to estimate the position of the rotor based on the first estimate of the rotational angle of the rotor and the direction of rotation of the rotor, and wherein
- the motor driver voltage signal comprises at least a first portion, a second portion, and a third portion,
- the first portion has a first non-zero voltage during a first temporal duration, the second portion has a second non-zero voltage during a second temporal duration, and the third portion has a substantially zero voltage during a third temporal duration,
- the first portion has a first polarity and the second portion has a second polarity that is opposite to the first polarity, and
- the first temporal duration and the second temporal duration are different.

19. The system of claim 18, wherein the second portion is between the first portion and the third portion.

20. The system of claim 18, wherein third temporal duration is different from the first temporal duration or the second temporal duration.

* * * * *